(12) United States Patent
Stewart

(10) Patent No.: US 7,672,306 B2
(45) Date of Patent: Mar. 2, 2010

(54) METHOD FOR SECURE RELIABLE POINT TO MULTI-POINT BI-DIRECTIONAL COMMUNICATIONS

(76) Inventor: Ian A. Stewart, 4125 Market St., Suite 18, Ventura, CA (US) 93003

( * ) Notice: Subject to any disclaimer, the term of this patent is extended or adjusted under 35 U.S.C. 154(b) by 544 days.

(21) Appl. No.: 11/458,201

(22) Filed: Jul. 18, 2006

(65) Prior Publication Data

US 2007/0025373 A1    Feb. 1, 2007

Related U.S. Application Data

(60) Provisional application No. 60/700,441, filed on Jul. 18, 2005.

(51) Int. Cl.
*H04L 12/28* (2006.01)
*H04J 3/26* (2006.01)
(52) U.S. Cl. ........................ 370/390; 370/432
(58) Field of Classification Search ............ None
See application file for complete search history.

(56) References Cited

U.S. PATENT DOCUMENTS 7,016,351 B1 *   3/2006   Farinacci et al. ............ 370/392
7,269,182 B1 *   9/2007   Carrel et al. ................. 370/432
7,430,222 B2 *   9/2008   Green et al. ................. 370/486
2002/0143951 A1 *  10/2002  Khan et al. .................. 709/227
2003/0206554 A1 *  11/2003  Dillon ......................... 370/432
2004/0010616 A1 *   1/2004  McCanne ..................... 709/238
2004/0090959 A1 *   5/2004  Cinghita et al. ............. 370/390
2004/0218603 A1 *  11/2004  Lee et al. ..................... 370/390

OTHER PUBLICATIONS

Handley et al., Bi-directional Protocol Independent Multicast (BIDIR-PIM), Jul. 18, 2004, Internet Engineering Task Force, draft-ietf-pim-bidir-07.txt, pp. 1-45.*
Lee et al., SMART: a Rapid Layer Adaptation Protocol for Layered Video Multicast, May-Jun. 2001, European Transactions on Telecommunications, vol. 12, Issue 3, pp. 205-216.*

* cited by examiner

*Primary Examiner*—Ayaz R Sheikh
*Assistant Examiner*—Timothy J Weidner
(74) *Attorney, Agent, or Firm*—Black Lowe & Graham PLLC

(57) ABSTRACT

Systems and methods for sending secure reliable point to multi-point communication on any communication infrastructure. The infrastructure is not required to conform to any specifications of this inventions other that be capable point to point communications. The system consists of a protocol that allows for Secure Reliable point to multi-point communications irregardless of the support for such communications. This invention does not rely on the Internet or ATM or any other point to point or point to multi-point communications infrastructure.

7 Claims, 4 Drawing Sheets

```
Packet structure for SRM-P2MP

= = = = = = = = = = = = = = = = = = = = = = = = = = = = = =
DATA PACKET Message TYP = 0x01 (binary 01)

ACCESS_SYNCH_CODE  8
PACKET_TYPE        2
CMD                2
RESERVED           4
PACKET SIZE       16
PACKET_NUMBER     16
PACKET FORMAT      2
DECRYPT_Y_N        1
QUIET·             4
RESERVED           1
[...PAYLOAD]

0                   1                   2                   3
                0 1 2 3 4 5 6 7 8 9 0 1 2 3 4 5 6 7 8 9 0 1 2 3 4 5 6 7 8 9 0 1
               +-+-+-+-+-+-+-+-+-+-+-+-+-+-+-+-+-+-+-+-+-+-+-+-+-+-+-+-+-+-+-+-+
               | Access Synch  | TYP  CMD RESRV|            Packet Size        |
               +-+-+-+-+-+-+-+-+-+-+-+-+-+-+-+-+-+-+-+-+-+-+-+-+-+-+-+-+-+-+-+-+
               |       Packet Sequence         | FMT D QUIET R    RESERVED     |
               +-+-+-+-+-+-+-+-+-+-+-+-+-+-+-+-+-+-+-+-+-+-+-+-+-+-+-+-+-+-+-+-+
               |                          Payload [1]                          |
               +-                                                             -+
               |                          ...........                         |
               +-+-+-+-+-+-+-+-+-+-+-+-+-+-+-+-+-+-+-+-+-+-+-+-+-+-+-+-+-+-+-+-+

(6 bits 64 types)
```

Packet structure for SRM-P2MP

= = = = = = = = = = = = = = = = = = = = = = = = = = = = = = =
DATA PACKET Message TYP = 0x01 (binary 01)

```
ACCESS_SYNCH_CODE 8
PACKET_TYPE       2
CMD               2
RESERVED          4
PACKET SIZE       16
PACKET_NUMBER     16
PACKET FORMAT     2
DECRYPT_Y_N       1
QUIET.            4
RESERVED          1
[...PAYLOAD]
```

(6 bits 64 types)

FIG. 2A

```
MESSAGES    Message TYP = 0x02 (binary 10)

ACCESS_SYNCH_CODE 8
PACKET_TYPE       2
CMD               6
PACKET_SIZE       16
[...PAYLOAD]
```

50

```
ADDR_RANGE CHANGE   CMD = 01   (binary 000001)

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Access Synch  | TYP  CMD    |         Packet Size             |
+-+-+-+-+-+-+-+-+-+-+-+-+-+-+-+-+-+-+-+-+-+-+-+-+-+-+-+-+-+-+-+-+
|                        Address [1]                            |
+-                                                             -+
|                        Address [2]                            |
+-+-+-+-+-+-+-+-+-+-+-+-+-+-+-+-+-+-+-+-+-+-+-+-+-+-+-+-+-+-+-+-+
```

54

```
USAGE_REPORT_JOIN CMD = 0x0002 (binary 000010)

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Access Synch  | TYP  CMD RESRV|        Packet Size            |
+-+-+-+-+-+-+-+-+-+-+-+-+-+-+-+-+-+-+-+-+-+-+-+-+-+-+-+-+-+-+-+-+
|                        Address [1]                            |
+-                                                             -+
|                        Address [2]                            |
+-+-+-+-+-+-+-+-+-+-+-+-+-+-+-+-+-+-+-+-+-+-+-+-+-+-+-+-+-+-+-+-+
```

60, 64

```
USAGE_REPORT_LEAVE CMD = 0x0003 (binary 000011)

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Access Synch  | TYP  CMD RESRV|        Packet Size            |
+-+-+-+-+-+-+-+-+-+-+-+-+-+-+-+-+-+-+-+-+-+-+-+-+-+-+-+-+-+-+-+-+
|                        Address [1]                            |
+-                                                             -+
|                        Address [2]                            |
+-+-+-+-+-+-+-+-+-+-+-+-+-+-+-+-+-+-+-+-+-+-+-+-+-+-+-+-+-+-+-+-+
```

ERROR_REPORT CMD = 0x000B (binary 001011)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Access Synch  | TYP  CMD RESRV|          Packet Size          |
+-+-+-+-+-+-+-+-+-+-+-+-+-+-+-+-+-+-+-+-+-+-+-+-+-+-+-+-+-+-+-+-+
|                     Reporting Address [1]                     |
+-                                                             -+
|                     Concerning  Address [2]                   |
+-+-+-+-+-+-+-+-+-+-+-+-+-+-+-+-+-+-+-+-+-+-+-+-+-+-+-+-+-+-+-+-+
|                       Message Data [1]                        |
+-                                                             -+
|                       Message Data [2]                        |
+-                                                             -+
|                       Message Data [3]                        |
+-+-+-+-+-+-+-+-+-+-+-+-+-+-+-+-+-+-+-+-+-+-+-+-+-+-+-+-+-+-+-+-+
```

PROBLEM_REPORT CMD = 0x0010 Binary (010000)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Access Synch  | TYP  CMD RESRV|          Packet Size          |
+-+-+-+-+-+-+-+-+-+-+-+-+-+-+-+-+-+-+-+-+-+-+-+-+-+-+-+-+-+-+-+-+
|                     Reporting Address [1]                     |
+-                                                             -+
|                     Concerning  Address [2]                   |
+-+-+-+-+-+-+-+-+-+-+-+-+-+-+-+-+-+-+-+-+-+-+-+-+-+-+-+-+-+-+-+-+
|                       Message Data [1]                        |
+-                                                             -+
|                       Message Data [2]                        |
+-                                                             -+
|                       Message Data [3]                        |
+-+-+-+-+-+-+-+-+-+-+-+-+-+-+-+-+-+-+-+-+-+-+-+-+-+-+-+-+-+-+-+-+
```

METHOD FOR SECURE RELIABLE POINT TO MULTI-POINT BI-DIRECTIONAL COMMUNICATIONS

PRIORITY CLAIM

This application claims priority to provisional application Ser. No. 60/700,441 filed on Jul. 18, 2005 which is incorporated herein by reference.

BACKGROUND OF THE INVENTION

In order to send data in a Communications network from point to multi-point it may be necessary to send point to multi-point data encapsulated in a point to point message. In order to be compatible with both methods of transmission one must create a protocol that rides on top of the infrastructure being used for communication. Most communication protocols have provisions for point to multi-point transmission but this type of support is optional and in many cases not supported. Until all communication protocols are required to support secure reliable point to multi-point messaging their will be a need for an overlaying protocol to allow for point to multi-point secure reliable transmission.

The current infrastructure for Point to Multi-Point Communications on such as ATM and IP commonly have drawbacks that this invention addresses.

A method for transmission of data (usually radio or television) from one sender to many receivers. For example: when one sends a IP or UPD packet the arrival of the packet at the destination is not guaranteed. This has become known as "fire it and forget it" transmission. The problem is that many types of communication protocols are also "fire and forget it" type of transmissions. Reliability is accomplished by best effort, and security is not addressed by the protocol at all. The solution is to create a new protocol (set of rules) that uses the existing infrastructure to create a secure, reliable, and scalable "one to many" transmission solution. While there may be many schemes to provide reliability and security to the Internet, these types all fail to be inter-operable.

It is the failure of interoperability that lead to the invention which is the subject of this patent application.

BRIEF DESCRIPTION OF THE DRAWINGS

Preferred and alternative embodiments of the present invention are described in detail below with reference to the following drawings:

FIGS. 2A and 2B show specific examples of commands using the protocol shown in FIG. 1.

DETAILED DESCRIPTION OF THE INVENTION

Terminology

Secure Reliable Point to Multi-Point communications (SRM-P2MP)

A sender of information to multi-point receivers is a sender node (SN).

A receiver of multi-point communication is called a multiple end node (MEN).

A repeater of data is called a multiple repeat node (MRN).

Figure 1:
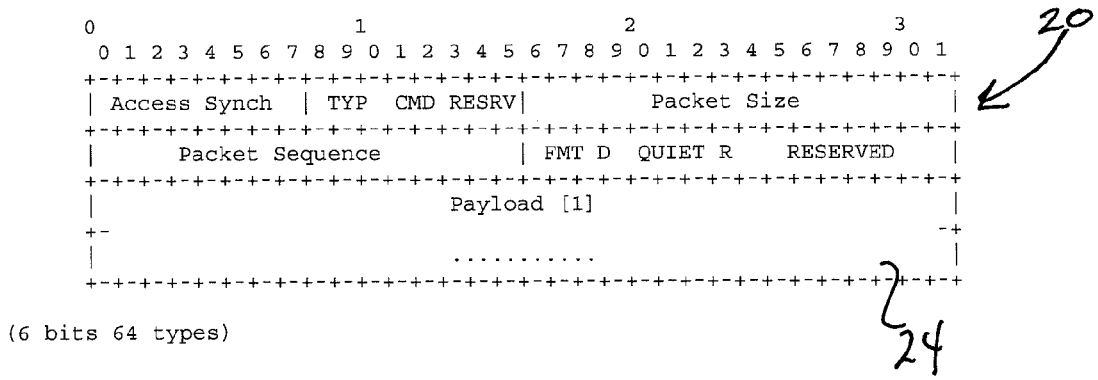
FIG. 1 shows a structure for a protocol formed in accordance with an embodiment of the present invention.

FIG. 1 shows the technical description of the protocol using a bit map to show an encapsulated packet 20. The encapsulated packet 20 includes a payload 24. The payload 24 includes a multicast broadcast and other bidirectional information, such as that shown in FIGS. 2A and B. The encapsulated packet 20 includes an access synchronization code info (ACCESS_SYNCH_CODE), packet type data (PACKET_TYPE), command info (CMD), packet size info (PACKET SIZE), packet number info (PACKET_NUMBER), packet format info (PACKET FORMAT), decryption info (DECRYPT_Y_N), go into quiet mode info (QUIET), and the actual payload.

As shown in FIG. 2A, a message address range change command (CMD) 50 includes address [1] and [2] information in a payload 54. A usage report of a multicast join USAGE_REPORT_JOIN CMD 60 includes a multicast source address (Address [1]) and an end user's IP address (Address [2]) in a payload 64. A usage report of an end user leaving a multicast broadcast USAGE_REPORT_LEAVE CMD 70 also includes the same address information as the USAGE_REPORT_JOIN CMD 60.

FIG. 2B shows an error reporting message ERROR_REPORT CMD 80 and a problem reporting message PROBLEM_REPORT CMD 90. They both include the end user's IP address (Reporting Address [1]) and the address of the multicast broadcaster (Concerning Address [2]).

Figure 3:
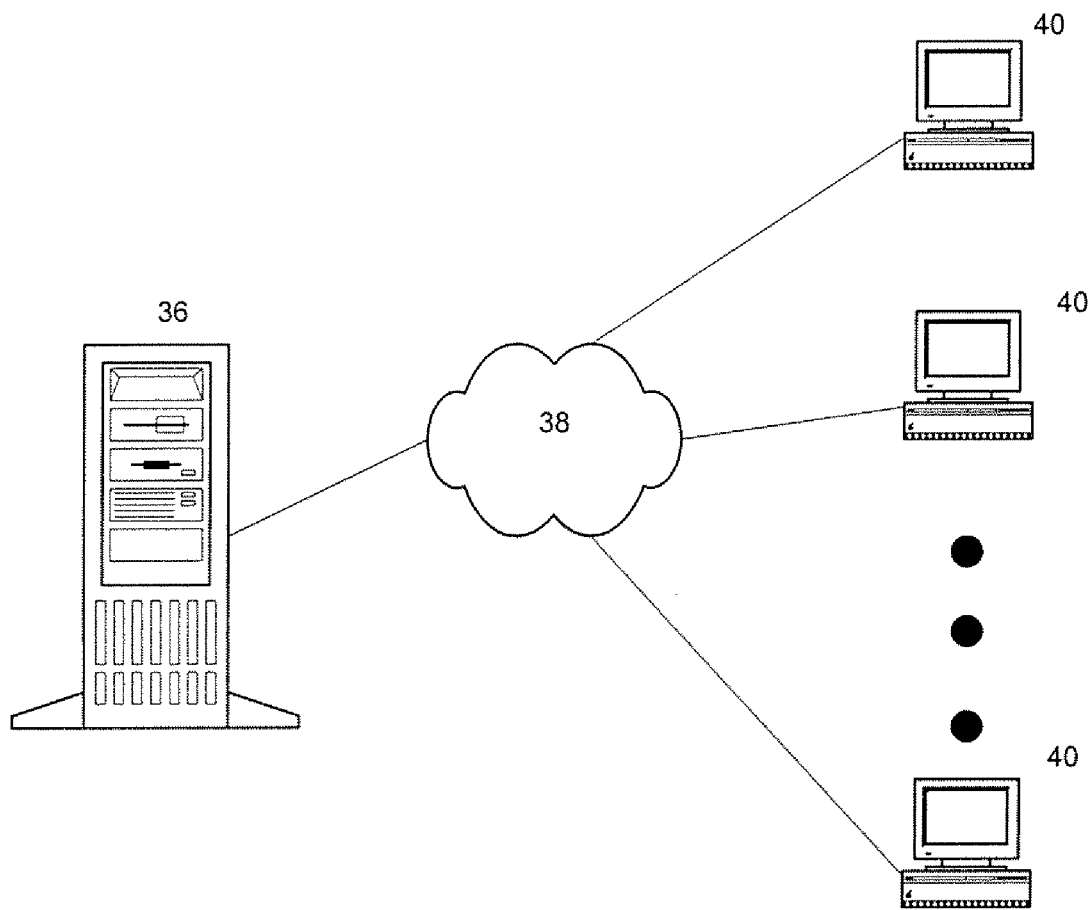
FIG. 3 shows an example network system that uses the protocols shown in FIGS. 2A and 2B.

Messages and multicast broadcast formatted according to the protocol shown in FIGS. 1, 2A and 2B are sent over a network 38 between a multicast broadcast system 36 or similar system and end user systems 40 see FIG. 3.

The above protocol is protocol independent. In other words this protocol is not dependent on any other underlying protocol and only assumes some type of communications infrastructure to be present. This could be but is not limited to IP or ATM type connections.

The present status of communications are a mixture of point to point and point to multi-point infrastructure. In a virtual sense communication protocols have supported both using sophisticated algorithms to form bridges and trees where necessary. These methods are not uniform and make it almost impossible to take advantage of point to multi-point infrastructure where it is available. This is because bridging from open point to multi-point using closed point to point must encapsulate the point to multi-point data resurfacing the data where point to multi-point communications can have advantage. This invention helps create a model for communications that can accomplish secure reliable point to multi-point communications irregardless of the underlying infrastructure.

The present invention creates a protocol that runs on top of the protocols comprising the current infrastructure. By establishing a point to multi-point protocol that is platform independent, the capsules that contain the point to multi-point data become homogenized.

A method for sending secure reliable point to multi-point transmissions. The method establishes an overlaying protocol which is interpreted at each end of the potential links and sends secure data to multiple receivers. The secure date includes but is not limited to audio, video, web pages, electronic files, inventories, status of electronic components, and battlefield information, insures the reliability of said transmissions; and exists between a sender node (SN) and multiple end nodes (MEN).

The protocol executing on an end node detects the core abilities of point to multi-point communication networks and incorporates those core abilities where possible.

The SN encapsulates messages to the MEN which include but are not limited to encapsulated DATA_PACKETS and MESSAGES.

A system sends secure reliable transmissions. The system includes a device coupled to a communications network and configured to encapsulate messages so as to take advantage of the infrastructure and ensure secure reliable transmissions from point to multi-point.

The communication system comprises an interface locally coupled to a network of communications systems.

The messages are encapsulated on both point to point links and point to multi-point links, thus enabling secure reliable point-to multi-point transmission regardless of the communications network.

The multi-point links can function in a tree like structure, thus contributing to efficiency.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the Claims that follow.

What is claimed is:

1. A method for sending secure reliable point to multi-point transmissions, the method comprising:
    establishing an overlaying protocol being interpretable at each end of potential links of a point to multi-point transmission; and
    sending feedback data from one of a plurality of multiple end nodes (MEN) being one end of the point to multi-point transmission to a sender node (SN) being another end of the point to multi-point transmission,
    wherein the feedback data is sent in accordance with the established overlaying protocol,
    whereby the feedback data provides the SN with information for improving reliability,
    wherein the SN encapsulates messages to the MEN comprising encapsulated DATA_PACKETS and MESSAGES based on the protocol,
    wherein the DATA_PACKETS contain ACCESS_SYNCH_CODE, PACKET_TYPE, CMD (command), RESERVED, PACKET SIZE, PACKET_NUMBER (sequence number), PACKET FORMAT, DECRYPT_Y_N, QUIET (stop requesting re-transmission for x time), and PAYLOAD.

2. The method of claim 1, wherein the feedback data provides information relating to at least one of joining a multicast broadcast, leaving a multicast broadcast, errors or problems.

3. A system for sending secure reliable transmissions between each end of a point to multi-point transmission, the system comprising:
    one of a plurality of multiple end node (MEN) devices coupled to a communications network, the MEN device configured to encapsulate one or more messages based on an established protocol, and
    a sender node (SN) device coupled to the communications network, the SN device configured to output a multicast broadcast and receive the encapsulated one or more messages from the MEN devices based on the established protocol, the encapsulated one or more messages being sent using at least one of an IP network or ATM network connection, whereby the information in the one or more messages allows the SN device to determine reliability of transmission,
    wherein the SN device encapsulates messages to the MEN devices comprising encapsulated DATA_PACKETS and MESSAGES based on the protocol,
    wherein the DATA_PACKETS contain ACCESS_SYNCH_CODE, PACKET_TYPE, CMD (command), RESERVED, PACKET SIZE, PACKET_NUMBER (sequence number), PACKET FORMAT, DECRYPT_Y_N, QUIET (stop requesting re-transmission for x time), and PAYLOAD.

4. The system of claim 3, wherein the one or more messages provide information relating to at least one of joining a multicast broadcast, leaving a multicast broadcast, errors or problems related to multicast broadcast.

5. The system of claim 3, wherein the one or more messages are encapsulated on point to point links.

6. The system of claim 3, wherein the one or more messages are encapsulated on point to multi-point links.

7. The system of claim 6, wherein the multi-point links function in a tree like structure.

* * * * *